(12) United States Patent
Roberts et al.

(10) Patent No.: US 11,656,682 B2
(45) Date of Patent: May 23, 2023

(54) METHODS AND SYSTEMS FOR PROVIDING AN IMMERSIVE VIRTUAL REALITY EXPERIENCE

(71) Applicant: The Salty Quilted Gentlemen, LLC, Columbia, MO (US)

(72) Inventors: Cody David Roberts, Columbia, MO (US); Ellery Scott Connell, Astoria, OR (US)

(73) Assignee: The Salty Quilted Gentlemen, LLC, Columbia, MO (US)

(*) Notice: Subject to any disclaimer, the term of this patent is extended or adjusted under 35 U.S.C. 154(b) by 0 days.

(21) Appl. No.: 17/366,005

(22) Filed: Jul. 1, 2021

(65) Prior Publication Data

US 2022/0004254 A1 Jan. 6, 2022

Related U.S. Application Data

(60) Provisional application No. 63/047,059, filed on Jul. 1, 2020.

(51) Int. Cl.
| | | |
|---|---|---|
| *G06F 3/01* | (2006.01) | |
| *G06T 19/00* | (2011.01) | |
| *H04N 21/81* | (2011.01) | |
| *H04N 21/462* | (2011.01) | |

(52) U.S. Cl.
CPC ............ *G06F 3/013* (2013.01); *G06T 19/006* (2013.01); *H04N 21/4621* (2013.01); *H04N 21/816* (2013.01)

(58) Field of Classification Search
CPC ........ G06F 3/013; G06F 3/011; G06T 19/006; H04N 21/4621; H04N 21/816; H04N 21/234363; H04N 21/23439; A63F 2300/8082
See application file for complete search history.

(56) References Cited

U.S. PATENT DOCUMENTS

| | | | | |
|---|---|---|---|---|
| 8,878,846 B1* | 11/2014 | Francis, Jr. | ........... | G06T 19/006 345/428 |
| 2008/0100588 A1* | 5/2008 | Nogami | .................. | G06F 3/016 345/173 |
| 2016/0180593 A1* | 6/2016 | Yang | ....................... | G06T 17/00 345/419 |
| 2016/0260196 A1* | 9/2016 | Roimela | .................. | G06T 11/60 |
| 2018/0063576 A1* | 3/2018 | Tillman | ............... | G11B 27/031 |
| 2018/0160160 A1* | 6/2018 | Swaminathan | ......... | H04L 65/70 |
| 2018/0173404 A1* | 6/2018 | Smith | ...................... | G06F 3/017 |
| 2018/0241988 A1* | 8/2018 | Zhou | ..................... | H04N 21/816 |
| 2021/0136341 A1* | 5/2021 | Ross | ....................... | G06F 3/011 |

* cited by examiner

*Primary Examiner* — Mihir K Rayan
(74) *Attorney, Agent, or Firm* — Stinson LLP (57) ABSTRACT

An immersive virtual reality experience is provided. A plurality of areas within a virtual environment are determined. The plurality of areas includes at least a first area and a second area. A plurality of videos associated with the virtual environment are presented. The plurality of videos include a first video associated with the first area and a second video associated with the second area. The first video has a first quality, and the second video has a second quality lower than the first quality. A three-dimensional model of a first object is overlaid in the virtual environment.

20 Claims, 7 Drawing Sheets

METHODS AND SYSTEMS FOR PROVIDING AN IMMERSIVE VIRTUAL REALITY EXPERIENCE

CROSS-REFERENCE TO RELATED APPLICATION

This application claims the benefit of U.S. Provisional Application No. 63/047,059, filed on Jul. 1, 2020, which is hereby incorporated by reference in its entirety.

BACKGROUND

The Coronavirus Disease 2019 (COVID-19) pandemic and the resultant measures to keep the public safe have made it difficult and/or onerous to watch sports, concerts, theater, or other live events. Prevailing health and societal dynamics have created a need for alternative solutions to watching games, concerts, and/or shows. While the technology has improved over the years, television and streaming services fail to replicate the experience of being physically present at the game, concert, and/or show. Likewise, known methods and system for providing a virtual reality (VR) experience are relatively limited. For example, some known VR experiences are provided using a pure video format captured by a single camera with a wide angle lens (e.g., for a 180-degree video) or by two opposing cameras with wide angle lenses (e.g., for a 360-degree video "stitched" together from two 180-degree videos). However, depth perception is generally difficult to convey using a pure video format. Aside from reducing immersion, known VR implementations of pure video format can also cause disorientation or motion sickness in at least some viewers.

To improve depth perception, some known VR systems use stereoscopic video that includes two channels with slightly different perspectives. Stereoscopic videos are typically captured using pairs of cameras that are spaced apart about the interpupillary distance of a typical person (e.g., the distance between a person's pupils). Because each eye receives its own video feed, parallax is created, increasing a sense of space and three dimensionality. However, because the cameras are in a fixed location, the depth perception may skew or decrease when looking anywhere other than directly forward. In addition, if the viewer tilts their head sideways (e.g., rotate about a roll axis), the images will "swim" and/or separate, making it difficult to focus and potentially causing disorientation or motion sickness. These issues preclude many spectators from using the technology and limit long term comfort making it challenging to watch an entire game or concert for example thus making existing solutions unsuitable for these applications.

SUMMARY

Examples described herein enable an immersive virtual reality experience to be provided in a spectrum-efficient manner, while also being comfortable and enjoyable for the user. In one aspect, a method is provided for providing an immersive virtual reality experience. The method includes determining at least a first area and a second area within a virtual environment, presenting a first video associated with the first area and a second video associated with the second area, and overlaying a three-dimensional model of a first object in the virtual environment. The first video has a first quality, and the second video has a second quality lower than the first quality.

In another aspect, an immersive virtual reality device is provided. The immersive virtual reality device includes one or more computer storage media including data associated with a virtual environment, one or more objects, and computer-executable instructions, and one or more processors configured to execute the computer-executable instructions. The processors execute the computer-executable instructions to determine at least a first area and a second area within the virtual environment, present a first video showing the first area, present a second video showing the second area, and overlay a three-dimensional model of a first object in the virtual environment. The first video has a first quality, and the second video has a second quality lower than the first quality.

In yet another aspect, a system is provided. The system includes one or more user sensors that detect one or more parameters associated with a user, and a presentation device that communicates with the one or more user sensors to provide an immersive virtual reality experience. Providing the immersive virtual reality experience includes determining at least a first area and a second area within a virtual environment, presenting at least a first video showing the first area and a second video showing the second area, and overlaying a three-dimensional model of a first object in the virtual environment. The first video has a first quality, and the second video has a second quality lower than the first quality.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Additional features and advantages of one or more embodiments of the present disclosure will be set forth in the Detailed Description, and in part will be obvious from the Detailed Description or may be learned by the practice of such example embodiments.

BRIEF DESCRIPTION OF THE DRAWINGS

This disclosure will be best understood by reference to the following Detailed Description when read in conjunction with the accompanying drawings, wherein.

Like parts are marked throughout the drawings, as well as throughout the Detailed Disclosure, with the same reference numerals. The drawings are for the purpose of illustration and description only and are not intended to define the scope of the claimed subject matter. The drawings are not necessarily drawn to scale, and certain drawings may be shown in exaggerated or generalized form in the interest of clarity and conciseness. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The present disclosure relates to user interfaces and, more particularly, to methods and systems for providing an immersive virtual reality (VR) experience. Examples described herein seek to address the issues with existing immersive VR solutions and create a comfortable and enjoyable viewing experience in a spectrum-efficient manner. The methods and systems of the present disclosure may craft an experience that blends real-time rendered computer-graphic environments with full-motion video (e.g., a filmed event, live streaming). For example, one or more three-dimensional (3D) models may be used to present one or more proximate objects, and one or more video feeds may be used to present one or more distant objects. Because the stereoscopic convergence distance of the human eye is about 10 meters from the vantage point, 3D models may be used to present one or more objects within a predetermined space (e.g., a luxury box, a front-row seat, a vehicle cabin) or within 10 meters of the predetermined space, and video feeds may be used to present one or more objects outside the predetermined space or beyond 10 meters of the predetermined space.

Figure 1:
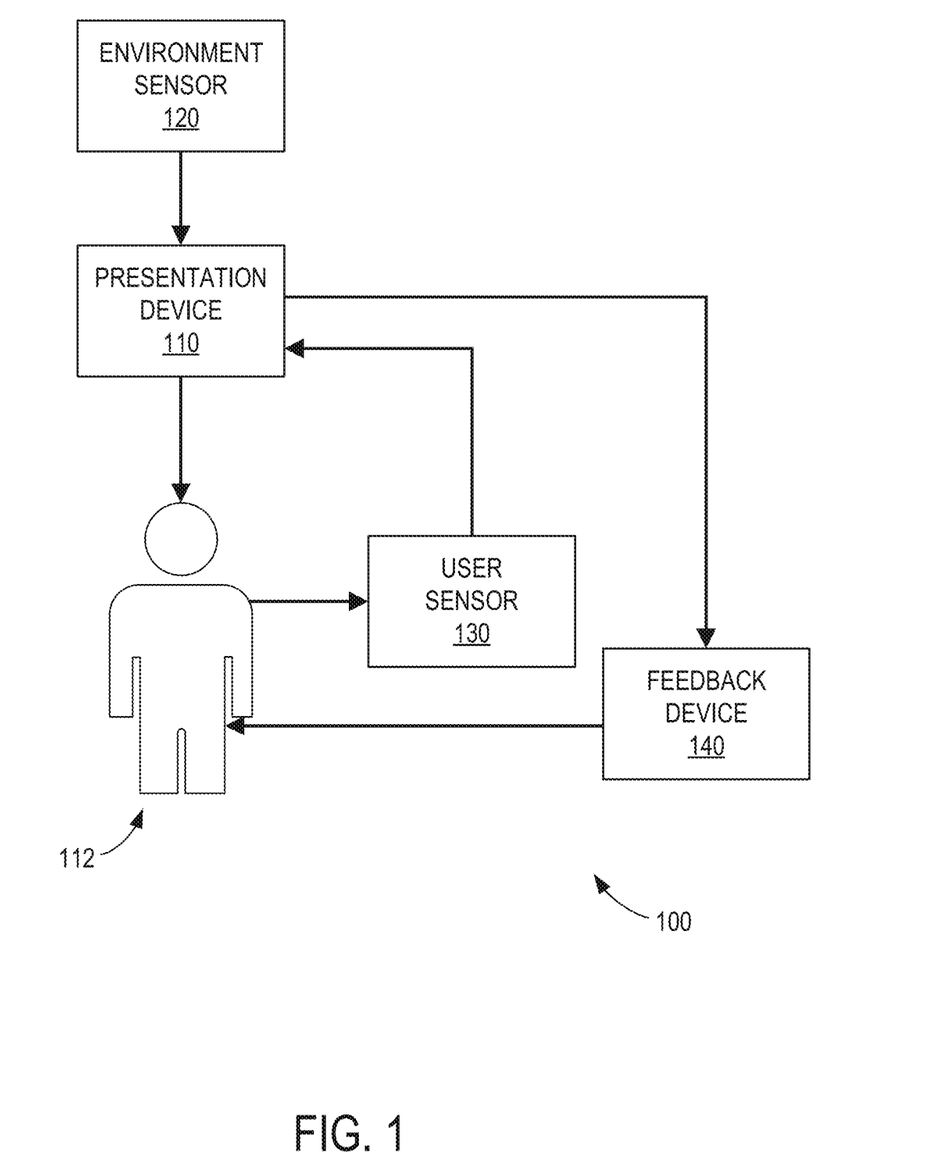
FIG. 1 includes a block diagram of an example immersive virtual reality experience system in accordance with aspects of the present disclosure.

Referring now to the drawings, which are provided for purposes of illustrating one or more examples and not for purposes of limiting the same, with reference to FIG. 1, an example immersive VR experience system 100 includes a presentation device 110 that presents a virtual environment to a user 112. In some examples, the presentation device 110 executes one or more applications ("apps") to selectively present a virtual environment that approximates a real-world location (e.g., luxury box, front-row seats), providing a first-class ticket experience to sports fans and venue attendees in the comfort and convenience of their own home.

At least a portion of the virtual environment may be created using a location capture node including and/or associated with one or more environment sensors 120. Example environment sensors 120 may include, without limitation, a high-resolution camera, a lower-resolution camera, a lidar (light detection and ranging) depth camera, a range sensor, a position and orientation sensor, a texture sensor, and any other sensor that may be used to generate data for use in creating the virtual environment based on a real-world environment.

In some examples, the immersive VR experience system 100 includes one or more user sensors 130 that detect one or more parameters associated with the user 112 and communicate with the presentation device 110 to enable the presentation device 110 to modify the virtual environment based on the detected parameters. User sensors 130 may enable the user 112 to provide user input. Example user sensors 130 may include, without limitation, a position sensor, a motion sensor, an accelerometer, a gyroscope, an inertial measurement unit (IMU) sensor, an eye-tracking sensor, an infrared sensor, an optical tracking sensor, and any other sensor that may be used to generate data for determining a user position, a user movement, a head position, a head orientation, a gaze direction, and the like. In some examples, the user sensors 130 detect a position and/or movement of the user's head or body (e.g., hands, feet), and adjust the virtual environment in accordance with the position and/or movement. In some examples, light, reflections, shadows, and/or texture are used to increase a fidelity or "realness" of the objects in the virtual environment.

The user 112 may look at or around the objects in the virtual environment and, in some instances, interact with the objects in the virtual environment. The presentation device 110 may convey visual feedback to the user 112. In some examples, the presentation device 110 includes or is coupled to one or more feedback devices 140 configured to convey information to the user 112 via one or more senses other than sight. For example, feedback devices 140 may provide tactile cues via electrical stimulation, vibration, and/or pushing forces; thermal cues; and/or auditory cues while the user 112 handles or interacts with one or more virtual objects or to indicate that the user 112 has approached or is approaching a virtual wall or other boundary within the virtual environment. Example feedback devices 140 may include, without limitation, actuators, stimulators, speakers, and any other device that may be used to convey non-visual cues to the user 112.

Figure 2:
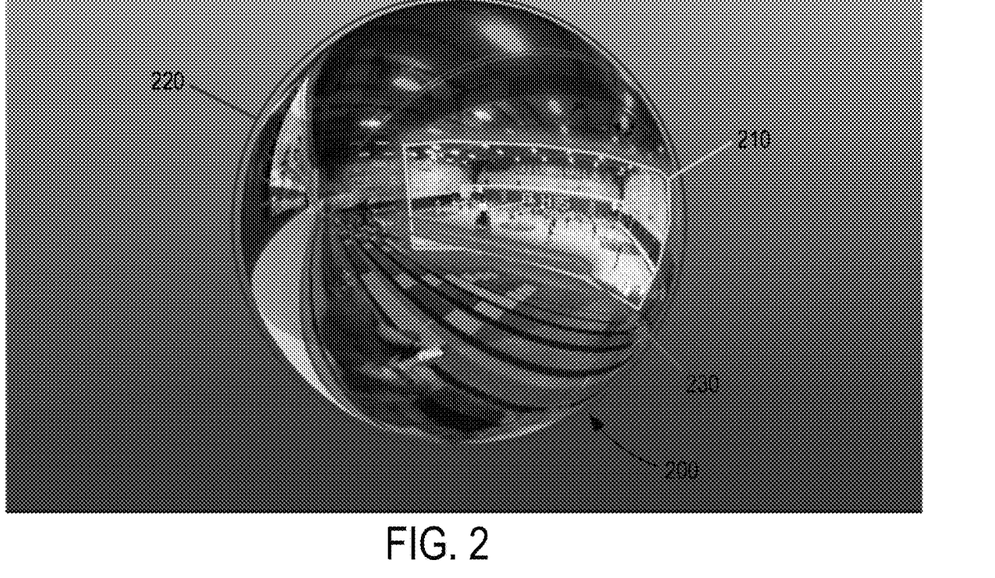
FIG. 2 includes an image showing a mapped perspective of an example virtual environment that may be presented in accordance with aspects of the present disclosure.
Figure 3:
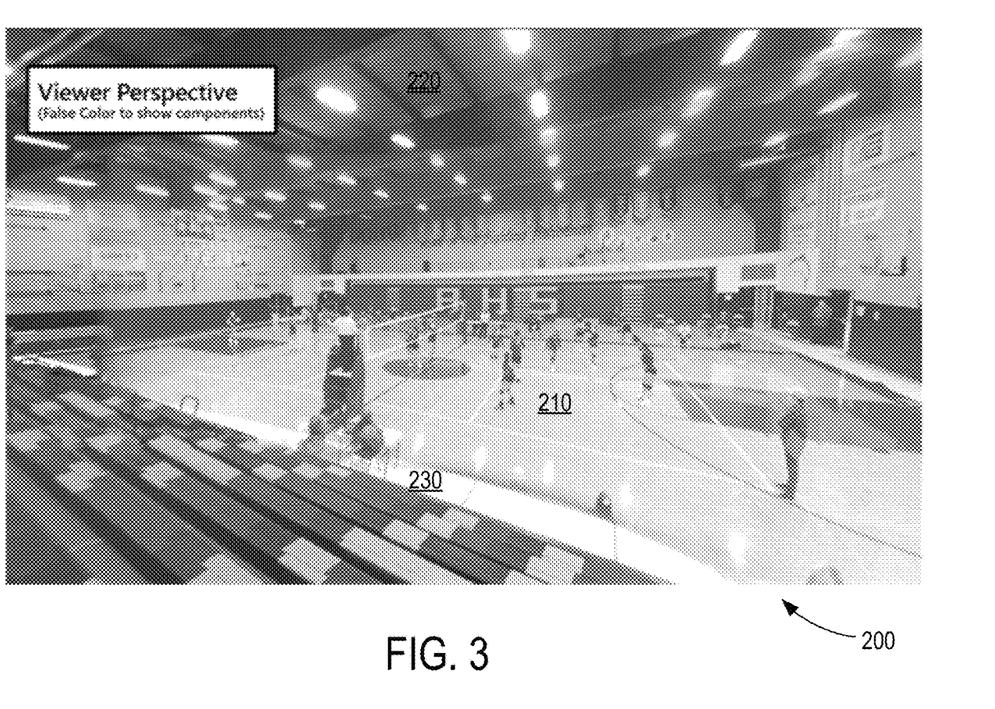
FIG. 3 includes an image showing a viewer perspective of the virtual environment shown in FIG. 2.
Figure 4:
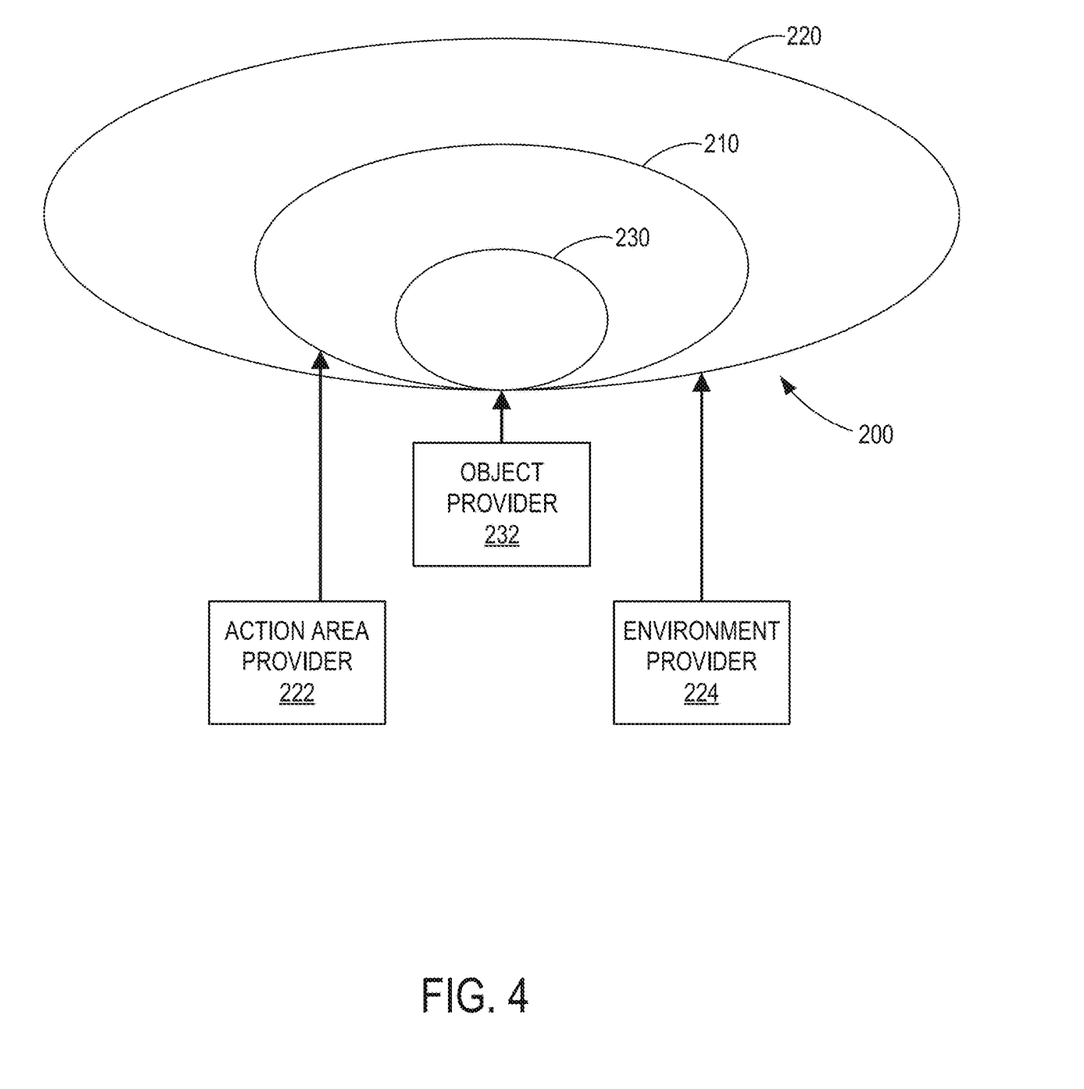
FIG. 4 includes a conceptual representation of the virtual environment shown in FIG. 2.

FIGS. 2-4 show an example virtual environment 200 that may be presented to the user 112 using the presentation device 110. To efficiently and/or effectively present the virtual environment 200 using the presentation device 110, the virtual environment 200 may be divided or partitioned into a plurality of areas including at least a first area 210 and a second area 220. In some examples, the areas (e.g., first area 210, second area 220) include one or more regular or semi-regular polygons that tessellate or substantially tessellate (with nominal overlap or gaps) to form a sphere or spheroid surrounding a vantage point inside the virtual environment 200. In this manner, the areas may be efficiently and effectively mapped onto 3D geometry.

The presentation device 110 may present the virtual environment 200 using a plurality of videos associated with the virtual environment 200, including a first video associated with the first area 210 and a second video associated with the second area 220. As shown in FIG. 4, an action area provider 222 may provide the first video associated with the first area 210, and an environment provider 224 may provide the second video associated with the second area 220. In some examples, the presentation device 110 is configured to control video playback of the first video and/or second video independent of the other. For example, the user 112 may be allowed to selectively rewind, slow, fast forward, or stop (i.e., pause) the first video and/or second video.

The first area 210 and/or second area 220 are determined to facilitate balancing user experience and technological requirements (e.g., response time, rendering quality, sampling rate, frame rate consistency, processing power, memory bandwidth, energy consumption). For example, the first video may have a first quality (e.g., a high-resolution video with a high frame rate) and the second video may have a second quality lower than the first quality (e.g., a lower-resolution video with a lower frame rate) while the second video is displayed in a 360-degree spherical angle and the first video is displayed in an angle that is less than 360 degrees (e.g., 90 degrees, 180 degrees). In some examples, the first area 210 and/or second area 220 may be predetermined based on application, venue, event, etc. For example, the first area 210 may be an action area (e.g., court, field, stage, etc.) or other area of interest, and the second area 220 may be an environment area (e.g., crowd, stands, bleachers, etc.) at least partially surrounding the action area.

In some examples, the first area 210 and/or second area 220 are fixed, given a particular vantage point. In such examples, the user 112 may move to change a head position, a head orientation, a gaze direction, etc., but the first area 210 and/or second area 220 stay the same (e.g., the perspective may change, but the polygons in the first area 210 do not move to the second area 220 and vice versa). Alternatively, the first area 210 and/or second area 220 may be dynamic. For example, the presentation device 110 may analyze one or more user parameters to determine an area of interest (e.g., based on gaze direction), and dynamically determine the first area 210 and/or second area 220 based on the area of interest (e.g., one or more polygons in the first area 210 become part of the second area 220 and/or vice versa as the perspective changes). Notwithstanding the above, if the user 112 moves to another vantage point (e.g., to a new user location within the virtual environment), the presentation device 110 may determine another first area 210 and/or second area 220 corresponding to the other vantage point and/or select a first video and/or second video for presentation based on the user position and/or gaze direction.

To facilitate creating an immersive VR experience, a high-quality, view-dependent, texture-mapped, three-dimensional (3D) model 230 of one or more objects are superimposed in the virtual environment 200. As shown in FIG. 4, an object provider 232 may overlay the objects in the virtual environment 200. The 3D models 230 may be created based on 3D scans of real-world objects that are or may be in the real-world location (e.g., chairs, stools, sofas, televisions). The 3D scans may be performed using one or more sensors (e.g., environment sensors 120) configured to generate one or more signals or sensor data based on one or more stimuli. Sensor data may include any information that enables a computing device to map or understand a real-world environment and/or various objects in the real-world environment. In some examples, one or more models 230 include complex geometric meshes including image-based representations of a 3D object that are rendered in real time at high frame rates. Alternatively, at least a portion of one model 230 may include simple geometric meshes including geometric-based representations of a 3D object that are pre-rendered at lower frame rates to facilitate reducing processing power, memory bandwidth, and/or energy consumption.

In some examples, the user 112 may interact with the objects in the virtual environment 200. For example, the presentation device 110 may analyze one or more user parameters to determine whether a user position and/or movement would affect a position and/or movement of one or more objects in the virtual environment 200 and changes or manipulates the position and/or movement of the objects accordingly. In some examples, a user movement is determined to indicate a desire to interact with a first object, and a 3D model of the first object is manipulated based on the user movement. If a user position and/or movement is in conflict with a position of one or more objects (e.g., a virtual representation of the user occupies or is projected to occupy the same virtual space as a virtual representation of one or more objects), the presentation device 110 may communicate with one or more feedback devices 140 to convey to the user 112 one or more non-visual sensory cues corresponding to the conflict. For example, when the user 112 closes their hand such that a virtual representation of the user's hand closes around a virtual representation of an object in the virtual environment 200, one or more feedback devices 140 may provide one or more tactile, thermal, and/or auditory cues conveying that the user 112 is holding the object. For another example, one or more feedback devices 140 may provide one or more tactile, thermal, and/or auditory cues conveying that the user 112 is prevented or restricted from moving beyond one or more viewer bounding areas in the virtual environment 200 (e.g., virtual luxury box, virtual front-row-seat, virtual vehicle cabin).

Figure 5:
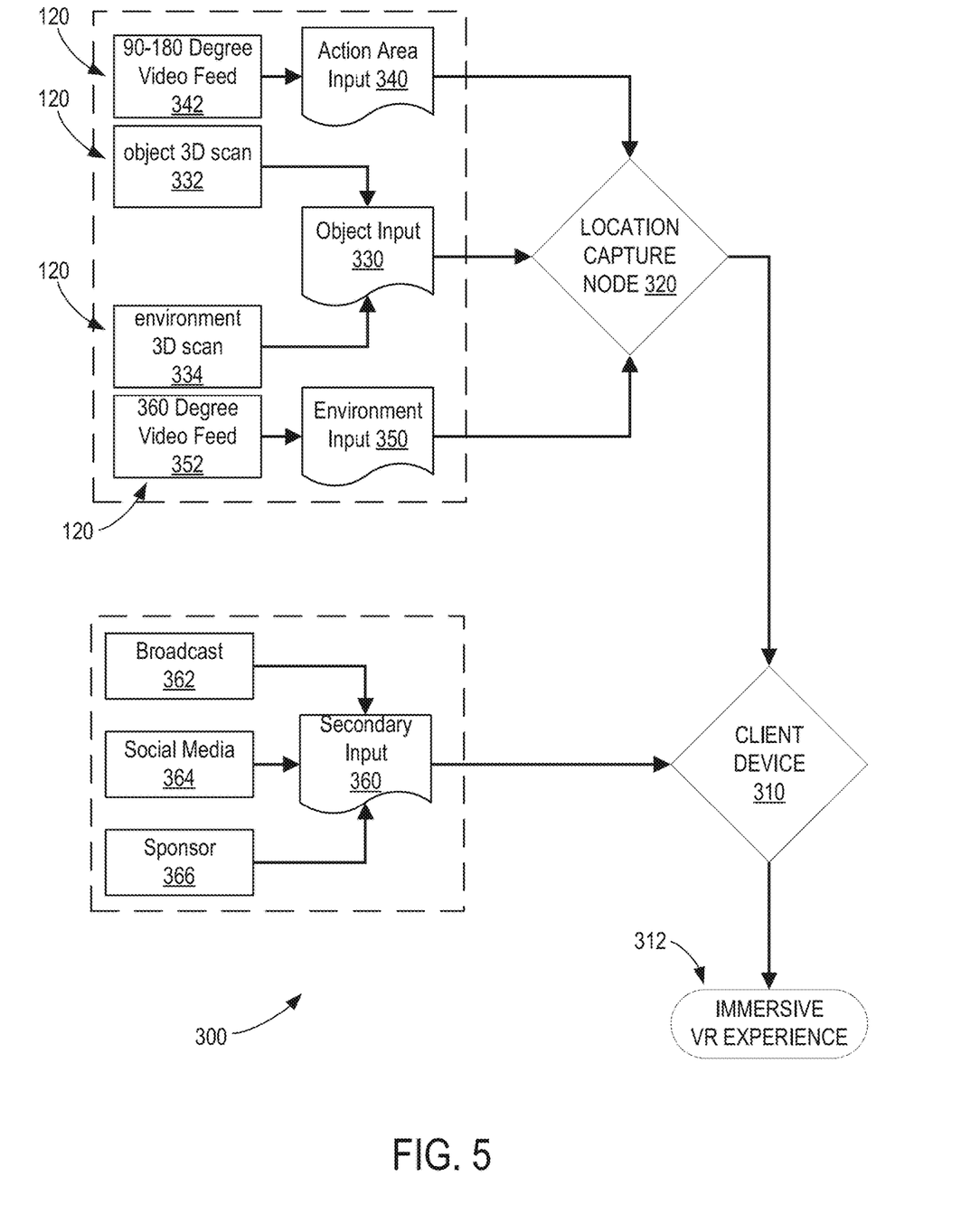
FIG. 5 includes a block diagram of an example system for providing content for use in creating an immersive virtual reality experience in accordance with aspects of the present disclosure.

FIG. 5 shows an example system 300 for providing content to a client device 310 (e.g., presentation device 110) for use in creating an immersive VR experience 312. To facilitate creating a virtual environment 200, the client device 310 may receive one or more site-based inputs from one or more environment sensors 120 (e.g., via location node 320). For example, one or more near-field objects (e.g., model 230) may be created using object input 330 from an object provider 232 (shown in FIG. 4). Object input 330 may be generated based on one or more 3D scans, including object 3D scans 332 of one or more real-world objects and/or environment 3D scans 334 of a real-world environment (e.g., luxury box, front-row seat, vehicle cabin), which may be performed using a contact 3D scanner (e.g., a coordinate measuring machine) and/or a non-contact 3D scanner (e.g., 3D laser scanner, lidar depth camera). 3D scanning can be performed beforehand or in real time (e.g., at the time of a live broadcast) depending on setup requirements, real-time scan fidelity, and/or security requirements.

Near-field objects may be combined with high-resolution content for an action area (e.g., first area 210) and lower-resolution content for an environment (e.g., second area 220) to give the virtual environment 200 a fully immersive presence. High-resolution content may be created using action area input 340 from an action area provider 222 (shown in FIG. 4). Action area input 340 may be generated based on a 90-180 degree video feed 342 of a real-world area of interest (e.g., court, field, stage, etc.), which may be provided using a high-resolution camera fitted with a wide-angle lens. Lower-resolution content may be created using environment input 350 from an environment provider 224 (shown in FIG. 4). Environment input 350 may be generated based on a 360 degree video feed 352 of a real-world environment (e.g., crowd, stands, bleachers, etc.) at least partially surrounding the real-world area of interest, which may be provided using a lower-resolution camera fitted with a wide-angle lens.

To mitigate the likelihood of seams and/or other inconsistencies in the virtual environment 200, the 90-180 degree video feed 342 and/or 360 degree video feed 352 may be composited and then blended with object 3D scans 332 and/or environment 3D scans 334. This blended combination of the object 3D scans 332, environment 3D scans 334, 90-180 degree video feed 342, and/or 360 degree video feed 352 provides enhanced comfort for users 112 (even for long term sessions) and greatly improves visual fidelity by focusing the first area 210 without losing full immersion of being completely surrounded by video. In some examples, one or more viewer bounding areas are created to at least partially restrain virtual user movement to one or more predetermined vantage points in a 3D portion of the virtual environment 200 (e.g., virtual luxury box, virtual front-row-seat, virtual vehicle cabin) and ensure the user 112 has an opportunity to have an unobstructed line of sight to the 90-180 degree video feed 342.

In some examples, the client device 310 may receive one or more secondary inputs 360 from a broadcast 362, social media 364, and/or a sponsor 366. This technology opens the doors for increased interaction with broadcasters associated with the broadcast 362, other spectators (e.g., via social media 364), sponsors 366, and more in a way that cannot be achieved by existing immersive video formats.

Figure 6:
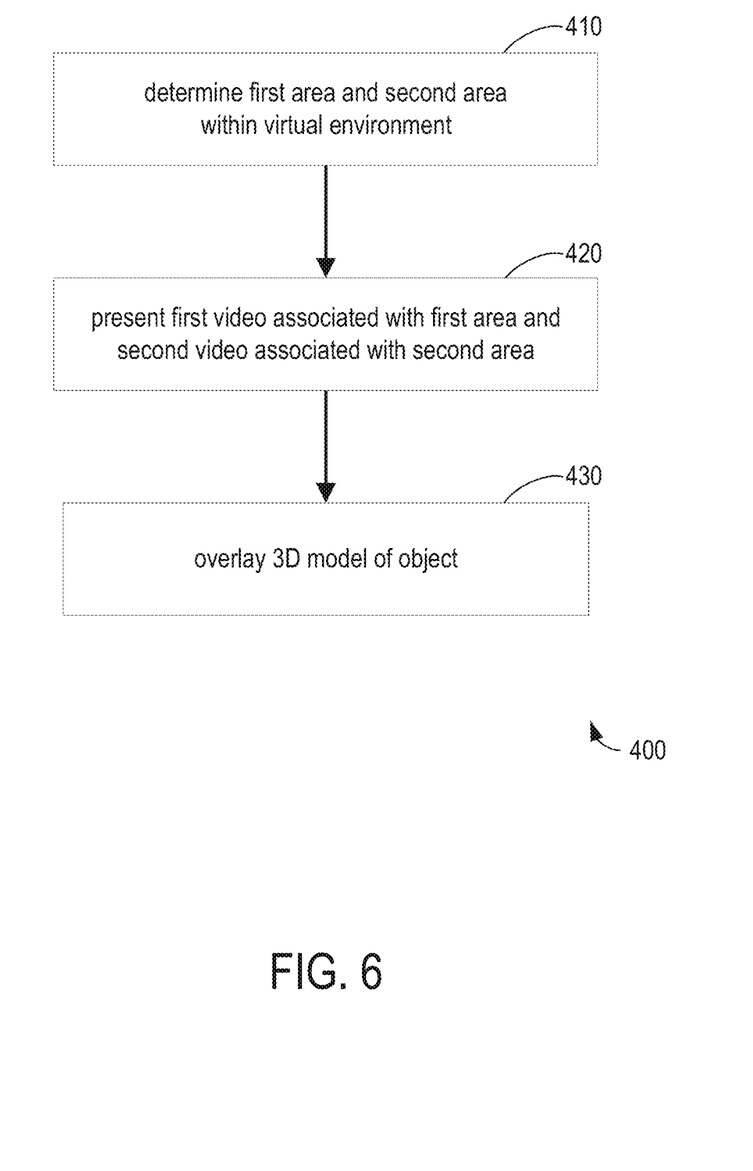
FIG. 6 includes a flowchart of an example method for providing an immersive virtual reality experience in accordance with aspects of the present disclosure.

FIG. 6 shows an example method 400 for providing an immersive virtual reality experience 312. The method 400 includes various operations that may be performed or executed by the presentation device 110 to present a virtual environment 200. The method 400 will be described with reference to various elements shown in FIGS. 1-5, though it is to be appreciated that the method 400 may be used with other systems and/or components to present the virtual environment 200. In some examples, a plurality of areas, including at least a first area 210 (e.g., an action area) and a second area 220 (e.g., an environment), are determined at operation 410. A plurality of video streams associated with the virtual environment 200 are presented at operation 420, including a first video associated with a first area (e.g., based on action area input 340) and a second video associated with a second area (e.g., based on environment input 350). A 3D model of one or more objects (e.g., based on object 3D scans 332 and/or environment 3D scans 334) is overlaid at operation 430.

Figure 7:
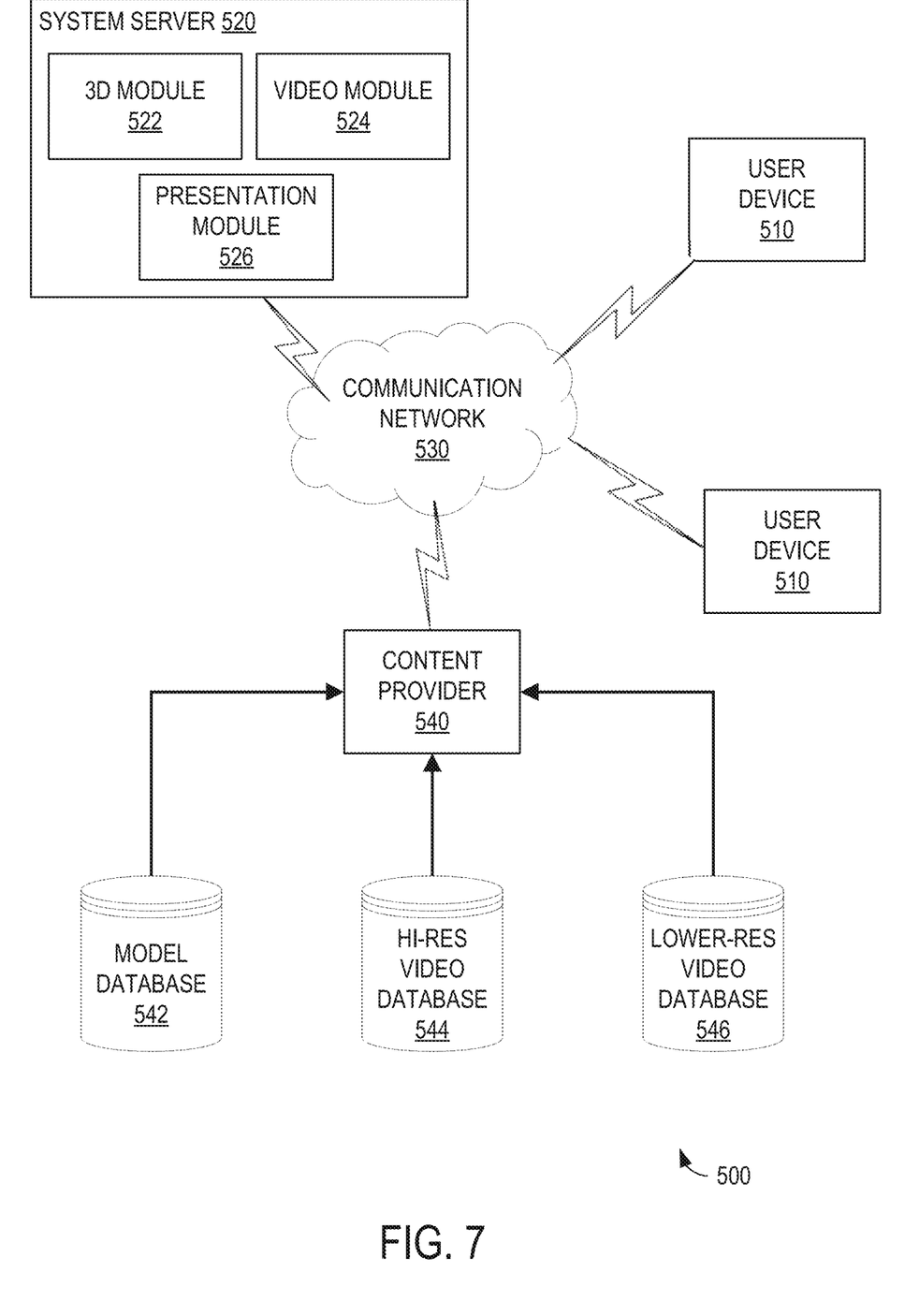
FIG. 7 includes a block diagram of an example environment for providing an immersive virtual reality experience in accordance with aspects of the present disclosure.

FIG. 7 shows an example environment 500 that allows a plurality of users (e.g., user 112) to virtually experience an event with other users. Each user 112 may use their own user device 510 to enjoy their own immersive VR experience 312. The user devices 510 include one or more client-side applications that perform one or more operations at the user devices 510 while one or more operations are performed remotely. For example, the client-side applications may allow the user devices 510 to communicate with one or more computing systems (e.g., the "cloud") that perform one or more back-end operations using one or more counterpart applications (e.g., server-side applications) and/or through one or more server-side services. In some examples, the user devices 510 transmit one or more signals to a system server 520 via a communication network 530 for back-end processing.

The system server 520 provides a shared pool of configurable computing resources to perform one or more back-end operations. The system server 520 may host or manage one or more server-side applications that include or are associated with VR technology, such as a video streaming application configured to generate the plurality of videos in the first area 210 and second area 220 and a 3D rendering application configured to generate one or more 3D models 230. The system server 520 may include or store data, such as object input 330, action area input 340, environment input 350, and/or secondary input 360. The data may be used, for example, to provide and/or create content for an immersive VR experience 312. The system server 520 may convert the data into one or more other forms (e.g., an analog signal to a digital form), remove at least some undesired portions ("noise"), and/or recognize or identify one or more objects in an environment (real-world or virtual). In some examples, the system server 520 includes a 3D module 522 for use in generating a 3D portion of the virtual environment 200 (e.g., based on object input 330), a video module 524 for use in generating a video portion of the virtual environment 200 (e.g., based on action area input 340 and environment input 350), and a presentation module 526 for use in combining the 3D portion of the virtual environment 200 with the video portion of the virtual environment, along with any other desirable portions (e.g., based on secondary input 360), to present an immersive VR experience 312.

In some examples, the system server 520 uses one or more annotations or identifiers that allow one or more objects, or one or more characteristics of an object, to be readily recognized or identified. The system server 520 may classify or identify an object as a static object, for example, if a position and/or orientation of the object is the same or substantially similar over time (e.g., based on sensor data associated with a first point in time and sensor data associated with a second point in time). Additionally or alternatively, the system server 520 may classify or identify an object as a dynamic object, for example, if a position and/or orientation of the object changes over time. The system server 520 may monitor or track dynamic objects by collecting data indicative of a level of activity or movement (e.g., speed, direction), as well as behavior patterns. In this manner, the system server 520 may predict or determine a position and/or orientation of dynamic objects.

The user device 510 and/or system server 520 may communicate with one or more content providers 540 to retrieve and/or receive various content, including content from a model database 542 (e.g., for use in the 3D portion of the virtual environment 200), video content from a high-resolution ("hi-res") video database 544 (e.g., for use in the action area portion of the virtual environment 200), video content from a lower-resolution ("lower-res") video database 546 (e.g., for use in the environment portion of the virtual environment 200), and/or secondary content from a secondary content database or other source (not shown). In some examples, the system server 520 includes, is included in, or is coupled to one or more artificial neural networks that "learn" and/or evolve based on information or insights gained through the processing of object input 330, action area input 340, environment input 350, and/or secondary input 360. A "module," as used herein, includes, but is not limited to, non-transitory computer readable medium that stores instructions, instructions in execution on a machine, hardware, firmware, software in execution on a machine, and/or combinations of each to perform one or more functions or actions, and/or to cause one or more functions or actions from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module, and single modules may be distributed among multiple modules.

In some examples, remote users 112 (i.e., other users in the same virtual environment 200) may be selectively presented in the virtual environment 200. For example, each user 112 may opt in or opt out from seeing, being shown to, or interacting with remote users 112. To present a remote user 112 in the virtual environment 200, a virtual position of the remote user 112 is determined, and a real-time rendered, high-quality, view-dependent, texture-mapped 3D model of the remote user 112 may be presented as an object (e.g., a "second" object) in the virtual environment 200 (e.g., model 230). Additionally or alternatively, one or more people or objects in the 3D portion and/or video portion of the virtual environment 200 may be filtered or edited out from the virtual environment 200.

The environment 500 includes one or more communication networks 530 that allow information to be communicated between a plurality of computing systems coupled to the communication networks 530 (e.g., user devices 510, system server 520, content provider 540). Example communication networks 530 include, without limitation, a cellular network, the Internet, a personal area network (PAN), a local area network (LAN), and a wide area network (WAN). One or more interfaces (not shown) may facilitate communication within the environment 500. The interfaces may include one or more gateways that allow the user devices 510, system server 520, and/or content providers 540 to communicate with each other and/or with one or more other computing systems for performing one or more operations. For example, the gateways may format data and/or control one or more data exchanges using an Open Systems Interconnection (OSI) model that enables the computing systems (e.g., user devices 510, system server 520, content provider 540) to communicate using one or more communication protocols. In some examples, the gateways identify and/or locate one or more target computing systems to selectively route data in and/or through the environment 500.

Figure 8:
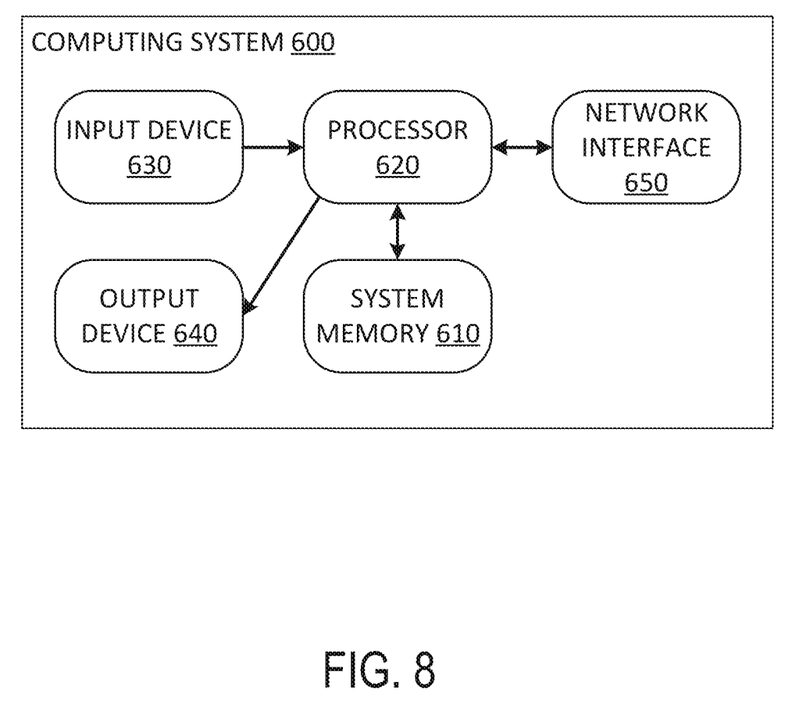
FIG. 8 includes a block diagram of an example computing system for performing one or more operations in accordance with aspects of the present disclosure.

FIG. 8 shows an example computing system 600 configured to perform one or more computing operations. While some examples of the disclosure are illustrated and described herein with reference to the computing system 600 being included in a presentation device 110 (shown in FIG. 1), user device 510 (shown in FIG. 7), system server 520 (shown in FIG. 7), and/or content provider 540 (shown in FIG. 7), aspects of the disclosure are operable with any computing system that executes instructions to implement the operations and functionality associated with the computing system 600. The computing system 600 shows only one example of a computing environment for performing one or more computing operations and is not intended to suggest any limitation as to the scope of use or functionality of the disclosure.

The computing system 600 includes a system memory 610 (e.g., computer storage media) and a processor 620 coupled to the system memory 610. The system memory 610 can store an operating system that controls or allocates resources of the computing system 600. In some examples, the system memory 610 and processor 620 are coupled via a bus that enables data to be transferred therebetween. As used herein, a "memory" can include non-volatile memory and/or volatile memory. Non-volatile memory can include read-only memory (ROM), programmable ROM (PROM), erasable PROM (EPROM), electrically erasable PROM (EEPROM), solid-state drives, and/or disks. Volatile memory can include random-access memory (RAM), static RAM (SRAM), dynamic RAM (DRAM), synchronous DRAM (SDRAM), and/or double data rate SDRAM (DDR SDRAM).

The system memory 610 includes one or more computer-readable media that allow information, such as the computer-executable instructions and other data, to be stored and/or retrieved by the processor 620. For example, the system memory 610 may include computer storage media in the form of read-only memory (ROM), random-access memory (RAM), magnetic tape, a floppy disk, a hard disk, a compact disc (CD), a digital versatile disc (DVD), a flash drive, a memory card, or any other medium that may be used to store desired information that may be accessed by the processor 620. By way of example, and not limitation, computer-readable media may include computer storage media and communication media. Computer storage media are tangible and mutually exclusive to communication media. Computer storage media are implemented in hardware and exclude carrier waves and propagated signals. That is, computer storage media for purposes of this disclosure are not signals per se.

In some examples, the system memory 610 stores data associated with one or more virtual environments 200 and/or immersive VR experiences 312 (e.g., object input 330, action area input 340, environment input 350, and/or secondary input 360), and computer-executable instructions, and the processor 620 is programmed or configured to execute the computer-executable instructions for implementing and/or managing aspects of the disclosure using, for example, the presentation device 110. The processor 620 may execute the computer-executable instructions to determine a plurality of areas (e.g., first area 210, second area 220) within the virtual environment 200, present a first video stream showing the first area 210, present a second video stream showing the second area 220, and overlay a 3D model 230 of one or more objects in the virtual environment 200.

As used herein, a "processor" processes signals and performs general computing and arithmetic functions. Signals processed by the processor 620 can include digital signals, data signals, computer instructions, processor instructions, messages, a bit, a bit stream, or other means that can be received, transmitted and/or detected. The processor 620 may include one or more processing units (e.g., in a multi-core configuration) to execute various functions. Although the processor 620 is shown separate from the system memory 610, examples of the disclosure contemplate that the system memory 610 may be onboard the processor 620, such as in some embedded systems.

A user or operator may enter commands and other input into the computing system 600 through one or more input devices 630 coupled to the processor 620. The input devices 630 are configured to receive information. Example input device 630 include, without limitation, a pointing device (e.g., mouse, trackball, touch pad, joystick), a keyboard, a game pad, a controller, a microphone, a camera, a gyroscope, an accelerometer, a position detector, and an electronic digitizer (e.g., on a touchscreen). Information, such as text, images, video, audio, and the like, may be presented to a user via one or more output devices 640 coupled to the processor 620. The output devices 640 are configured to convey information, images, sounds, smells, etc. to the user 112. Example output devices 640 include, without limitation, a monitor, a projector, a printer, a speaker, a vibrating component. In some examples, an output device 640 is integrated with an input device 630 (e.g., a capacitive touch-screen panel, a controller including a vibrating component).

One or more network interfaces 650 may be used to operate the computing system 600 in a networked environment using one or more logical connections. Logical connections include, for example, local area networks, wide area networks, and the Internet. The network interfaces 650 allow the processor 620, for example, to convey information to and/or receive information from one or more remote devices, such as another computing system or one or more remote computer storage media. Computer communication between computing systems can be a network transfer, a file transfer, an applet transfer, an email, a hypertext transfer protocol (HTTP) transfer, and so on. A computer communication can occur across a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others. Network interfaces 650 may include a network adapter, such as a wired or wireless network adapter or a wireless data transceiver.

Examples described herein enable a virtual environment 200 to show or approximate a real-world event (e.g., sports, concert, theater). In some examples, the virtual environment 200 is presented using a VR headset. For example, the presentation device 110 may include wireless or mobile-powered options, like the Oculus Quest headset. (Oculus Quest is a registered trademark of Facebook Technologies, LLC of Menlo Park, Calif.). This disclosure accounts for near-field objects, an action area, and an environment by combining one or more 3D models 230 with a high-resolution video and a lower-resolution video. This combination allows the presentation device 110 to present the user 112 with an immersive VR experience 312, giving the user 112 the ability to move around a designated area or predetermined space, switch between seat locations, and even communicate with others who are viewing the event with them in the virtual environment 200.

The videos may be taken using one or more cameras in the real-world location with wide angle (e.g., 170-210 degrees) lenses. The videos may be broadcast live or be prerecorded. With the added perception afforded by the 3D objects in the virtual environment 200, the presentation device 110 may present or direct one set of images (e.g., a single monoscopic video feed) to both eyes. Using one set of images allows the system to use images with higher quality or resolution and/or to occupy less memory or bandwidth than if two sets of images were being used (e.g., for 360-degree views and/or for stereoscopic video feeds). Moreover, using one set of images allows the user 112 to tilt their head without the video "swimming" or separating during use.

In some examples, video is presented on the hemisphere in front of the user 112 (e.g., first area 210) and/or on the hemisphere above the user 112 (second area 220). The video presented on the hemisphere above the user 112 may be at a lower resolution than the video presented on the hemisphere in front of the user 112. Video played on the hemisphere in front of the user 112 and/or on the hemisphere above the user 112 may be used to help light and provide reflections in the virtual environment 200 to tie the real and the virtual together. This is captured all or in part by a video and computing node which contains at least two cameras along with bespoke positional calibration mechanisms to fine tune the alignment of various elements in the virtual environment 200.

Examples described herein allow viewers to experience an event from their preferred seats with a high degree of realism and feel like actually being at the event. In some examples, the system is configured to present other feedback (e.g., sounds, smells, etc.) for further creating immersion to the event being presented in the virtual environment 200. A plurality of audio channels, for example, may be presented via a plurality of speakers disposed around the user 112 (e.g., surround sound) to provide positional audio and enrich the fidelity and depth of noises heard in the virtual environment 200. The mixed media nature of the presentation allows for and even encourages audio and video feeds from outside of the real-world location. This could include but not be limited to: communications with friends/family/community, input and feedback from broadcasters or commentators, sponsor content, and the ability to rewind, slow, or stop the video feed. Since the models are an integral part of the realistic representation of the event, manipulation of the models is possible without harming the viewer's sense of immersion.

The solutions described herein create a virtual reality experience that blends real-time rendered computer graphics environments with full motion video to create an environment that that offers six degrees of freedom, reduces or eliminates the possibility of motion sickness, promotes depth perception of near-field objects, allows high-resolution video to be selectively used, and creates an immersive experience of an event. This viewing experience will revolutionize the way people remotely view sports, live shows, and other spectator events. Further use of this technology could be for emergency or first responder training, military training, pilot training, sports training, and more.

Example systems and methods for providing an immersive virtual reality experience are described herein and illustrated in the accompanying drawings. Various examples may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

This written description uses examples to disclose aspects of the disclosure and also to enable a person skilled in the art to practice the aspects, including making or using the above-described systems and executing or performing the above-described methods. Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense. For example, the examples described herein may be implemented and utilized in connection with many other applications such as, but not limited to, training for fields including emergency, first responder, military, pilot, sports, and more.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

When introducing elements of the disclosure or the examples thereof, the articles "a," "an," "the," and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

In view of the above, it will be seen that the several objects of the disclosure are achieved and other advantageous results attained. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for providing an immersive virtual reality experience, the method comprising:
   determining a plurality of areas within a virtual environment, the plurality of areas including at least a first area and a second area, the first area associated with an area of interest, the second area associated with an environment;
   presenting a plurality of videos associated with the virtual environment, the plurality of videos including a first video associated with the first area and a second video associated with the second area, the first video having a first quality and displayed in a first angle, the second video having a second quality lower than the first quality and displayed in a second angle different from the first angle; and
   overlaying a three-dimensional model of a first object in the virtual environment.

2. The method of claim 1, further comprising:
   determining a user movement indicating a desire to interact with the first object; and
   manipulating the three-dimensional model of the first object based on the user movement.

3. The method of claim 1, further comprising:
   determining a position of the first object within the virtual environment;
   determining a user position within the virtual environment; and
   on condition that the user position is in conflict with the position of the first object, presenting one or more non-visual sensory cues indicating the conflict.

4. The method of claim 1, further comprising determining a user position within the virtual environment, wherein one or more of the first area or the second area are determined based on the user position.

5. The method of claim 1, further comprising determining a gaze direction within the virtual environment, wherein one or more of the first area or the second area are determined based on the gaze direction.

6. The method of claim 1, further comprising:
   determining a position of a remote user within the virtual environment;
   overlaying a three-dimensional model of a second object in the virtual environment, the second object corresponding to the remote user.

7. The method of claim 1, further comprising allowing a user to selectively control video playback of one of the first video or the second video independent of the other.

8. The method of claim 1, wherein presenting the plurality of videos further comprises:
   displaying the first video in the first angle, wherein the first angle is less than 360 degrees; and
   displaying the second video in the second angle, wherein the second angle is 360 degrees.

9. The method of claim 1, further comprising fixing the first area to a predetermined area of interest.

10. The method of claim 1, further comprising analyzing one or more user parameters to determine the area of interest, wherein determining the plurality of areas further comprises dynamically determining one or more of the first area or the second area based on the area of interest.

11. The method of claim 1, further comprising receiving one or more secondary inputs, wherein the plurality of videos include one or more third videos associated with the one or more secondary inputs.

12. An immersive virtual reality device comprising:
   one or more computer storage media including data associated with a virtual environment, one or more objects, and computer-executable instructions; and
   one or more processors configured to execute the computer-executable instructions to:
      determine a plurality of areas within the virtual environment, the plurality of areas including at least a first area and a second area;
      present a first video showing the first area, the first video having a first quality and displayed in a first angle;
      present a second video showing the second area, the second video having a second quality lower than the first quality and displayed in a second angle different from the first angle; and
      overlay a three-dimensional model of a first object of the one or more objects in the virtual environment.

13. The immersive virtual reality device of claim 12, wherein the one or more processors are further configured to execute the computer-executable instructions to:
   determine a user movement indicating a desire to interact with the first object; and
   manipulate the three-dimensional model of the first object based on the user movement.

14. The immersive virtual reality device of claim 12, wherein the one or more processors are further configured to execute the computer-executable instructions to:
   determine a position of the first object;
   determine a user position; and
   on condition that the user position is in conflict with the position of the first object, present one or more non-visual sensory cues indicating the conflict.

15. The immersive virtual reality device of claim 12, wherein the one or more processors are further configured to execute the computer-executable instructions to determine one or more of a user position or a gaze direction, wherein one or more of the first area or the second area are determined based on the one or more of the user position or the gaze direction.

16. The immersive virtual reality device of claim 12, wherein the one or more processors are further configured to execute the computer-executable instructions to allow a user to selectively control video playback of one of the first video or the second video independent of the other.

17. A system comprising:
one or more user sensors that detect one or more parameters associated with a user; and
a presentation device that communicates with the one or more user sensors to provide an immersive virtual reality experience, wherein providing the immersive virtual reality experience includes:
   determining at least a first area and a second area within a virtual environment,
   presenting a plurality of videos associated with the virtual environment, the plurality of videos including at least a first video showing the first area and a second video showing the second area, the first video having a first quality and displayed in a first angle, the second video having a second quality lower than the first quality and displayed in a second angle different from the first angle, and
   overlaying a three-dimensional model of a first object in the virtual environment.

18. The system of claim 17, wherein the presentation device determines a user movement indicating a desire to interact with the first object and manipulates the three-dimensional model of the first object based on the user movement.

19. The system of claim 17, further comprising one or more feedback devices configured to present one or more non-visual sensory cues, wherein the presentation device determines a position of the first object, determines a user position, and, on condition that the user position is in conflict with the position of the first object, communicates with the one or more feedback devices to present a first cue of the one or more non-visual sensory cues.

20. The system of claim 17, wherein the presentation device determines one or more of a user position or a gaze direction and selects one or more of the first video or the second video for presentation based on the one or more of the user position or the gaze direction.

* * * * *